United States Patent
Naito et al.

(10) Patent No.: US 8,687,953 B2
(45) Date of Patent: Apr. 1, 2014

(54) PHOTOGRAPHIC OPTICAL DEVICE, PHOTOGRAPHIC OPTICAL SYSTEM AND DISTANCE VARIATION AMOUNT DETECTING DEVICE

(75) Inventors: Hayato Naito, Nagano (JP); Toshiyuki Karasawa, Nagano (JP); Ryoji Komatsu, Nagano (JP); Hisahiro Ishihara, Nagano (JP)

(73) Assignee: Nidec Sankyo Corporation (JP)

( * ) Notice: Subject to any disclaimer, the term of this patent is extended or adjusted under 35 U.S.C. 154(b) by 0 days.

(21) Appl. No.: 13/819,932

(22) PCT Filed: Aug. 24, 2011

(86) PCT No.: PCT/JP2011/069073
§ 371 (c)(1),
(2), (4) Date: Feb. 28, 2013

(87) PCT Pub. No.: WO2012/029610
PCT Pub. Date: Mar. 8, 2012

(65) Prior Publication Data
US 2013/0156412 A1 Jun. 20, 2013

(30) Foreign Application Priority Data
Sep. 1, 2010 (JP) .................................. 2010-195841

(51) Int. Cl.
G03B 17/00 (2006.01)
(52) U.S. Cl.
USPC .......................................................... 396/55
(58) Field of Classification Search
USPC ............................. 396/52, 54, 55; 348/208.1
See application file for complete search history.

(56) References Cited

U.S. PATENT DOCUMENTS

| | | | | |
|---|---|---|---|---|
| 4,462,671 A | * | 7/1984 | Suzuki et al. | 396/54 |
| 5,369,462 A | * | 11/1994 | Miyazawa et al. | 396/54 |
| 6,282,376 B1 | * | 8/2001 | Shiomi | 396/55 |
| 2007/0121095 A1 | * | 5/2007 | Lewis | 356/5.01 |
| 2011/0096178 A1 | * | 4/2011 | Ryu et al. | 348/208.2 |

FOREIGN PATENT DOCUMENTS

| | | |
|---|---|---|
| JP | 9-80510 A | 3/1997 |
| JP | 10-197924 A | 7/1998 |
| JP | 2004-252037 A | 9/2004 |
| JP | 2007-41418 A | 2/2007 |
| JP | 2009-294393 A | 12/2009 |
| JP | 2010-96807 A | 4/2010 |

OTHER PUBLICATIONS

International Search Report for International Application No. PCT/JP2011/069073, mailed Oct. 4, 2011, with English translation.

* cited by examiner

*Primary Examiner* — Rodney Fuller
(74) *Attorney, Agent, or Firm* — Cantor Colburn LLP (57) ABSTRACT

A photographic optical device may include a reflection type optical sensor comprising a light emitting element and a light receiving element; a support body to which the reflection type optical sensor is fixed; a camera module comprising a lens and an imaging element; a shake correction mechanism structured to swing the camera module; a resistor configured to convert an output current of the light receiving element to an output voltage; a home position voltage creating means configured to create a home position voltage; a comparator configured to compare the home position voltage with a predetermined reference voltage; and a variable current source configured to control an electric current supplied to the light emitting element based on an output signal from the comparator. A relative position of the camera module with respect to the support body may be detected by the reflection type optical sensor.

16 Claims, 4 Drawing Sheets

Fig. 5

PHOTOGRAPHIC OPTICAL DEVICE, PHOTOGRAPHIC OPTICAL SYSTEM AND DISTANCE VARIATION AMOUNT DETECTING DEVICE

CROSS REFERENCE TO RELATED APPLICATIONS

This is a U.S. national stage of International Application No. PCT/JP2011/069073, filed on Aug. 24, 2011. Priority under 35 U.S.C. §119(a) and 35 U.S.C. §365(b) is claimed from Japanese Application No. 2010-195841, filed Sep. 1, 2010, the disclosure of which is also incorporated herein by reference.

TECHNICAL FIELD

The present invention relates to a photographic optical device having a shake correcting function structured to correct a blur of an optical image, and relates to a photographic optical system including the photographic optical device. Further, the present invention relates to a distance variation amount detecting device which detects a variation of a relative distance between an object to be detected and a reflection type optical sensor.

BACKGROUND

In recent years, a photographic optical device is mounted on a portable device such as a cellular phone. In a case of a portable device, a shake in hand is easily occurred at the time of photographing. Therefore, a photographic optical device which is capable of correcting a shake in hand at the time of photographing has been proposed by the present applicant (see, for example, Patent Literature 1).

The photographic optical device described in Patent Literature 1 includes a movable module on which a lens and an imaging element are mounted, a fixed body which supports the movable module, a shake correction mechanism which is structured to swing the movable module on the fixed body to correct a shake in hand, and a gimbal spring which connects the movable module with the fixed body. Further, the photographic optical device described in Patent Literature 1 includes a photo reflector for detecting a position of the movable module which is capable of swinging. The photo reflector includes, for example, a light emitting diode (LED) structured to emit light toward the movable module and a photo-transistor which receives the light reflected by the movable module and the photo reflector is fixed to the fixed body. In a photo reflector, commonly, a light emitting amount of a light emitting diode varies depending on a supplied electric current and an output current of a photo-transistor varies depending on an amount of the received light.

In order to detect a position of the movable module by a photo reflector, an output current of a photo-transistor (in other words, an output of the photo reflector) is utilized. However, even when a distance between the movable module and the photo reflector is constant, it is difficult to keep an output of the photo reflector substantially constant. The principal reasons are as follows; firstly, the light emitting efficiency of a light emitting diode is provided with an individual difference and, secondly, the sensitivity of a photo-transistor is provided with an individual difference and, thirdly, there are environmental variations such as aged deterioration of the reflection factor of the movable module, change in ambient temperature and the like.

Conventionally, a photo reflector control device has been proposed which is capable of keeping an output of a photo reflector substantially constant (see, for example, Patent Literature 2). In Patent Literature 2, the photo reflector is used for detecting perforations of a photographic film and the photo reflector is disposed so that, when light emitted from a light emitting diode is reflected by a predetermined reflection surface through a perforation, the reflected light is received by the photo-transistor. Further, the photo reflector control device described in Patent Literature 2 controls an electric current supplied to the light emitting diode so that an output of the photo reflector falls within a predetermined range. Therefore, when the photo reflector control device is used, influences of individual differences of a light emitting diode and a photo-transistor (individual difference of an element) and an environmental variation are restrained and an output of the photo reflector is capable of being kept substantially constant.

PATENT LITERATURE

[PTL 1] Japanese Patent Laid-Open No. 2009-294393
[PTL 2] Japanese Patent Laid-Open No. Hei 10-197924

When the photo reflector control device described in Patent Literature 2 is used, in a case that a distance between a reflection surface and the photo reflector is constant, influence of the individual difference of the element and an environmental variation can be restrained. However, in a case like a photographic optical device in which a distance between a movable module which reflects light from a light emitting diode and a photo reflector is varied, an output of the photo reflector is varied depending on swinging of the movable module and thus, even when the photo reflector control device described in Patent Literature 2 is used as it is, influence of an individual difference of the element and an environmental variation is not restrained.

SUMMARY

In view of the problem described above, at least an embodiment of the present invention provides a photographic optical device and a photographic optical system including the photographic optical device which are capable of obtaining an output of a reflection type optical sensor in which influence of an individual difference of the element of a reflection type optical sensor and an environmental variation is restrained even when a distance between a camera module which reflects light from the light emitting element and the reflection type optical sensor is varied. Further, at least an embodiment of the present invention is to provide a distance variation amount detecting device which is capable of obtaining an output of a reflection type optical sensor in which influence of an individual difference of the element of a reflection type optical sensor and an environmental variation is restrained even when a distance between an object to be detected which reflects light from the light emitting element and the reflection type optical sensor is varied.

In order to attain the above, at least an embodiment of the present invention provides a photographic optical device including a reflection type optical sensor having a light emitting element whose light emitting amount is varied depending on a supplied electric current and a light receiving element whose output current is varied depending on an amount of received light, a support body to which the reflection type optical sensor is fixed, a camera module having a lens and an imaging element and is supported by the support body so as to be capable of swinging, and the camera module reflecting light from the light emitting element toward the light receiving element, a shake correction mechanism structured to swing the camera module so as to incline an optical axis of the lens with respect to the support body to correct a shake, a resistor which converts an output current of the light receiving element to an output voltage, a home position voltage creating means which creates a home position voltage that is an output voltage of the light receiving element when the camera module is located at a predetermined home position or in the vicinity of the home position, a comparator which compares the home position voltage created by the home position voltage creating means with a predetermined reference voltage, and a variable current source which controls an electric current supplied to the light emitting element based on an output signal from the comparator. A relative position of the camera module with respect to the support body is detected by the reflection type optical sensor.

In the photographic optical device in accordance with at least an embodiment of the present invention, a home position voltage creating means creates a home position voltage which is an output voltage of the light receiving element when the camera module is located at a home position or in the vicinity of home position, a comparator compares the home position voltage created by the home position voltage creating means with a predetermined reference voltage, and a variable current source controls an electric current supplied to the light emitting element based on an output signal from the comparator. Therefore, even when a distance between the camera module which reflects light from the light emitting element and the reflection type optical sensor is varied with swinging of the camera module and, as a result, even when the output voltage of the reflection type optical sensor is varied, the output voltage of the light receiving element (in other words, output of the reflection type optical sensor) when the camera module is located at the home position or in the vicinity of the home position is maintained substantially constant. Accordingly, in at least an embodiment of the present invention, even when a distance between the camera module and the reflection type optical sensor is varied with swinging of the camera module, an output of the reflection type optical sensor is obtained in which influence of an individual difference of the element of the reflection type optical sensor and an environmental variation is restrained. As a result, in at least an embodiment of the present invention, even when there are individual difference of the element of a reflection type optical sensor and an environmental variation, the position of the camera module is appropriately detected by the reflection type optical sensor and a shake correction is appropriately performed.

In at least an embodiment of the present invention, for example, the variable current source decreases an electric current supplied to the light emitting element based on an output signal from the comparator which is outputted when the home position voltage is larger than the reference voltage, the variable current source increases an electric current supplied to the light emitting element based on an output signal from the comparator which is outputted when the home position voltage is smaller than the reference voltage, and the variable current source maintains an electric current supplied to the light emitting element when the home position voltage is substantially equal to the reference voltage and an output signal is not outputted from the comparator. According to this structure, the output of the reflection type optical sensor is maintained substantially constant when the camera module is located at the home position or in the vicinity of the home position.

In at least an embodiment of the present invention, it is preferable that the shake correction mechanism includes a drive coil structured to swing the camera module, and a spring member which connects the support body with the camera module and holds the camera module at the home position when an electric current is not supplied to the drive coil, and the home position voltage creating means judges whether the camera module is located at the home position or in the vicinity of the home position or not based on an electric current supplied to the drive coil and the home position voltage creating means creates the home position voltage. According to this structure, the camera module when an electric current is not supplied to the drive coil is held at the home position by the spring member and thus, the home position voltage creating means judges whether the camera module is located at the home position or in the vicinity of the home position or not with a high degree of accuracy based on the electric current supplied to the drive coil. Therefore, the home position voltage creating means creates a home position voltage with a high degree of accuracy based on an electric current supplied to the drive coil.

In at least an embodiment of the present invention, it is preferable that the home position voltage creating means judges that the camera module is located at the home position or in the vicinity of the home position when an electric current supplied to the drive coil is within a predetermined reference range to create the home position voltage. According to this structure, in comparison with a case that the home position voltage creating means creates a home position voltage only when an electric current is not supplied to the drive coil, an updating frequency of the home position voltage is increased. Therefore, an output of the reflection type optical sensor is obtained in which influence of an environmental variation such as temperature variation is appropriately restrained.

In at least an embodiment of the present invention, it is preferable that the home position voltage creating means creates an average value of a plurality of output voltages of the light receiving element, which are sampled within a predetermined time period when the electric current supplied to the drive coil is within the predetermined reference range, as the home position voltage. An output voltage of the light receiving element is easily varied when an electric current supplied to the drive coil is within a predetermined reference range. According to this structure, in comparison with a case that an output voltage of the light receiving element when an electric current supplied to the drive coil is within a predetermined reference range is set in a home position voltage as it is, accuracy of the created home position voltage is enhanced.

In at least an embodiment of the present invention, for example, it may be structured that the home position voltage creating means is a low pass filter which eliminates a high-frequency component of an output voltage of the light receiving element, and the output voltage of the light receiving element after the high-frequency component is eliminated is the home position voltage. Further, in at least an embodiment of the present invention, for example, it may be structured that the home position voltage creating means is an average value calculator which calculates an average value of a plurality of output voltages of the light receiving element that are sampled within a predetermined time period, and the average value of a plurality of output voltages of the light receiving element which is calculated by the average value calculator is the home position voltage. In these cases, the home position voltage creating means is not required to judge an electric current supplied to the drive coil and thus the structure of the home position voltage creating means is relatively simplified. Further, even in these cases, influence of variation of an output voltage due to swinging of the camera module is restrained and thus the home position voltage creating means is capable of creating the home position voltage with a higher degree of accuracy.

The photographic optical device in accordance with at least an embodiment of the present invention may be applied to a photographic optical system which includes an angular velocity sensor structured to detect a variation of inclination of the support body. In this system, the home position voltage creating means judges whether the camera module is located at the home position or in the vicinity of the home position or not based on an output signal from the angular velocity sensor or an integral value of an output signal from the angular velocity sensor to create the home position voltage. In the photographic optical system, even when a distance between the camera module which reflects light from the light emitting element and the reflection type optical sensor is varied depending on swinging of the camera module, an output of the reflection type optical sensor is obtained in which influence of an individual difference of the element of the reflection type optical sensor and an environmental variation is restrained. Further, when there is no output signal from the angular velocity sensor, or when an output signal from the angular velocity sensor is small, the support body is not inclined or its inclination is a little and thus a shake correcting operation is not performed and the camera module is located at the home position or in the vicinity of home position. Therefore, in this case, the home position voltage creating means is capable of creating the home position voltage with a higher degree of accuracy based on an output signal from the angular velocity sensor or an integral value of an output signal from the angular velocity sensor.

The photographic optical device in accordance with at least an embodiment of the present invention may be applied to a photographic optical system which includes a control means which controls "ON" and "OFF" of a shake correcting function of the photographic optical device. In this system, it may be structured that the home position voltage creating means creates and stores the home position voltage when the shake correcting function is in an "OFF" state and, when the shake correcting function is in an "ON" state, the comparator compares the home position voltage stored in the home position voltage creating means when the shake correcting function is in the "OFF" state with the reference voltage. In this photographic optical system, even when a distance between the camera module which reflects light from the light emitting element and the reflection type optical sensor is varied depending on swinging of the camera module, an output of the reflection type optical sensor is obtained in which influence of an individual difference of the element of the reflection type optical sensor and an environmental variation is restrained. Further, when the shake correcting function is in an "OFF" state, an electric current is not supplied to the drive coil and thus the camera module is located at the home position. Therefore, in this case, the home position voltage creating means is capable of creating a further higher degree of the home position voltage.

Further, at least an embodiment of the present invention provides a distance variation amount detecting device having a reflection type optical sensor which is provided with a light emitting element whose light emitting amount is varied depending on a supplied electric current and a light receiving element whose output current is varied depending on an amount of received light, and the distance variation amount detecting device detects a variation of a relative distance between a movable object to be detected which reflects light from the light emitting element toward the light receiving element and the reflection type optical sensor. The distance variation amount detecting device includes a resistor which converts an output current of the light receiving element to an output voltage, a home position voltage creating means which creates a home position voltage that is an output voltage of the light receiving element when the movable object is located at a predetermined home position or in the vicinity of the home position, a comparator which compares the home position voltage created by the home position voltage creating means with a predetermined reference voltage, and a variable current source which controls an electric current supplied to the light emitting element based on an output signal from the comparator.

In the distance variation amount detecting device in accordance with at least an embodiment of the present invention, the home position voltage which is an output voltage of the light receiving element is created by the home position voltage creating means when an object to be detected is located at a home position or in the vicinity of the home position, the home position voltage created by the home position voltage creating means and the reference voltage are compared with each other by the comparator, and an electric current supplied to the light emitting element is controlled by the variable current source based on an output signal from the comparator. Therefore, even when the output of the reflection type optical sensor is varied due to a variation of the distance between an object to be detected and the reflection type optical sensor with movement of the object, an output voltage of the light receiving element (output of the reflection type optical sensor) when the object is located at the home position or in the vicinity of the home position is capable of being kept substantially constant. Accordingly, in at least an embodiment of the present invention, even when a distance between an object to be detected which reflects light from the light emitting element and the reflection type optical sensor is varied with movement of the object, the output of the reflection type optical sensor is obtained in which influence of the individual difference of the element of the reflection type optical sensor and an environmental variation is restrained. As a result, in at least an embodiment of the present invention, even when there are an individual difference of the element of the reflection type optical sensor and an environmental variation, a variation of a relative distance between the object to be detected and the reflection type optical sensor is appropriately detected by the reflection type optical sensor.

As described above, in the photographic optical device and the photographic optical system in accordance with at least an embodiment of the present invention, even when a distance between the camera module and the reflection type optical sensor is varied, an output of the reflection type optical sensor is obtained in which influence of an individual difference of the element of the reflection type optical sensor and an environmental variation is restrained. Further, in the distance variation amount detecting device in accordance with at least an embodiment of the present invention, even when a distance between an object to be detected which reflects light from the light emitting element and the reflection type optical sensor is varied, an output of the reflection type optical sensor is obtained in which influence of the individual difference of the element of the reflection type optical sensor and an environmental variation is restrained.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

At least a embodiment of the present invention will be described below with reference to the accompanying drawings.

(Schematic Structure of Photographic Optical Device)

Figure 1:
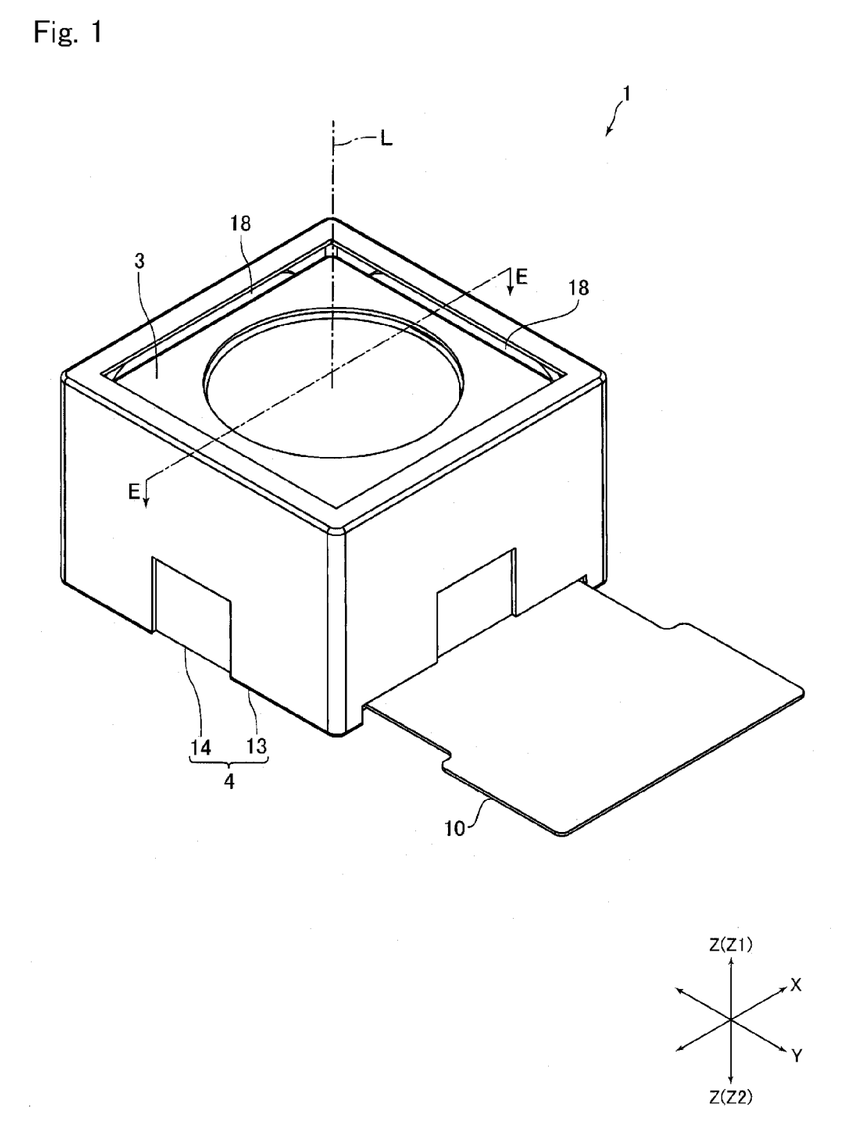
FIG. 1 is a perspective view showing a photographic optical device in accordance with an embodiment of the present invention.
Figure 2:
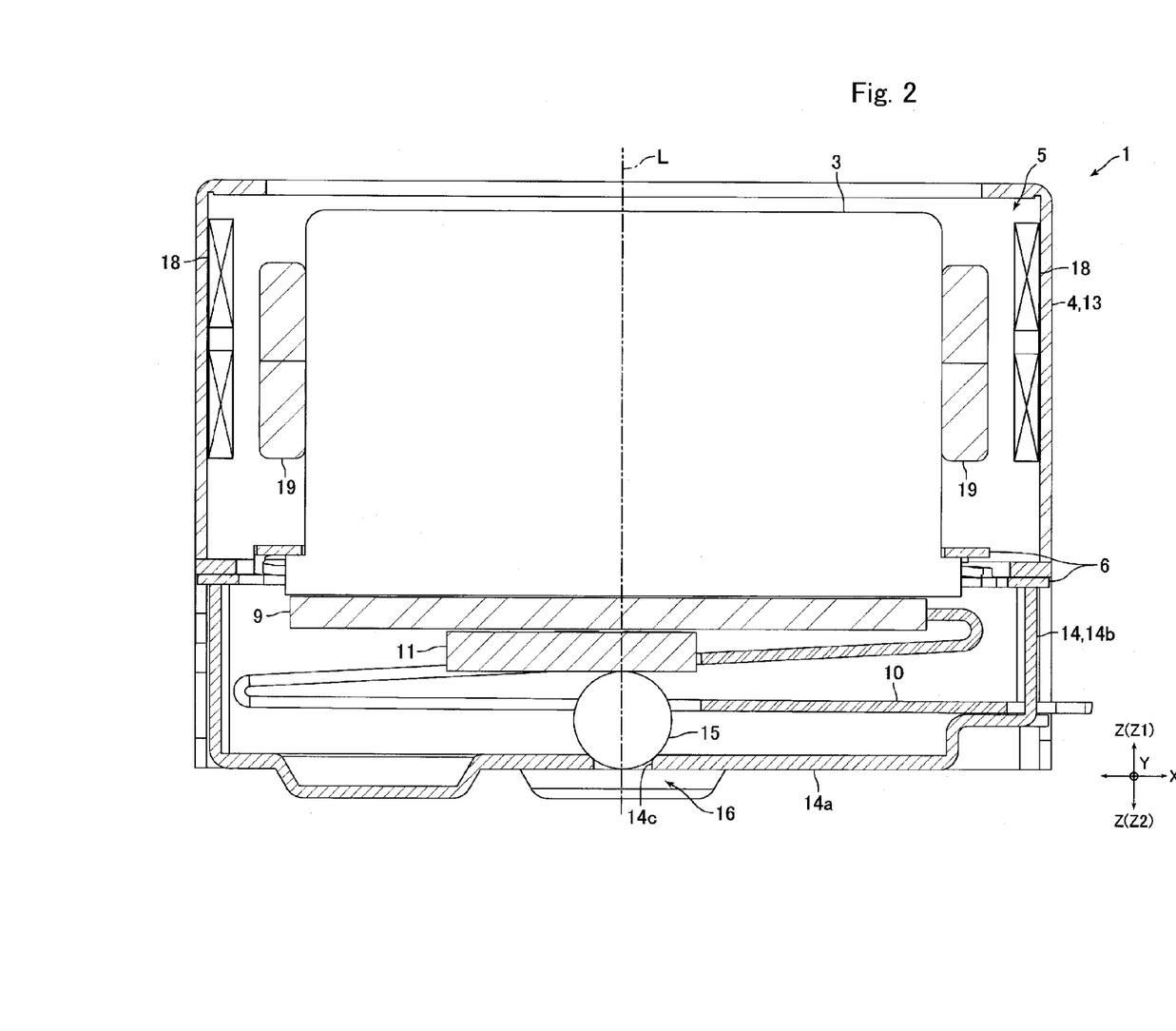
FIG. 2 is a cross-sectional view showing the "E-E" cross section in FIG. 1.
Figure 3:
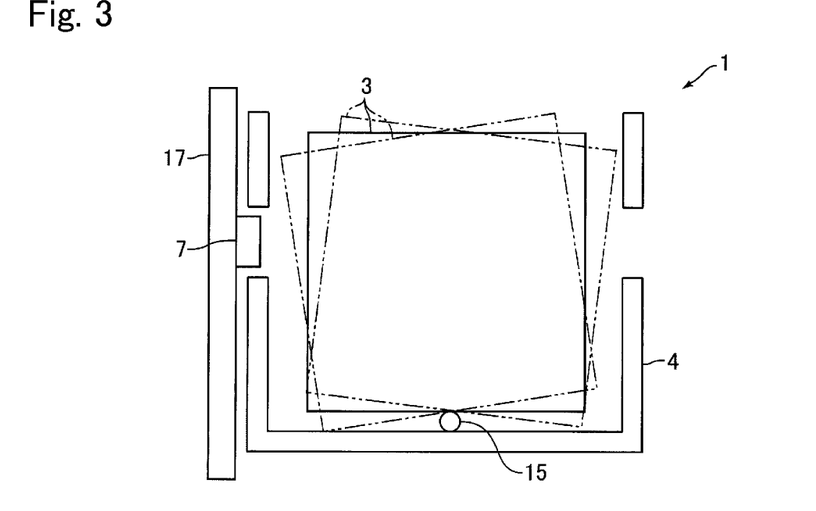
FIG. 3 is a schematic view showing an arrangement relationship between a camera module and a reflection type optical sensor in the photographic optical device shown in FIG. 1.

FIG. 1 is a perspective view showing a photographic optical device 1 in accordance with an embodiment of the present invention. FIG. 2 is a cross-sectional view showing the "E-E" cross section in FIG. 1. FIG. 3 is a schematic view showing an arrangement relationship between a camera module 3 and a reflection type optical sensor 7 in the photographic optical device 1 shown in FIG. 1. In the following descriptions, as shown in FIG. 1, three directions perpendicular to each other are respectively set in an "X" direction, a "Y" direction and a "Z" direction, and the "X" direction is set in a right and left direction, the "Y" direction is set in a front and rear direction and the "Z" direction is set in an upper and lower direction. Further, a "Z1" direction side is set in an "upper" side and a "Z2" direction side is set in a "lower" side.

The photographic optical device 1 in this embodiment is a small and thin camera used in a photographic optical system which structures a part of a portable device such as a cellular phone, a drive recorder, a monitoring camera system or the like. The photographic optical device 1 is provided with a shake correcting function. The photographic optical system in which the photographic optical device 1 is used includes an angular velocity sensor (gyroscope) for detecting a variation of inclination of the photographic optical device 1 (more specifically, variation of inclination of a support body 4 described below). Specifically, the photographic optical system includes an angular velocity sensor for detecting a variation of inclination in the front and rear direction of the photographic optical device 1 and an angular velocity sensor for detecting a variation of inclination in the right and left direction of the photographic optical device 1. Further, the photographic optical system includes a control means which controls on/off of a shake correcting function of the photographic optical device 1. The angular velocity sensors and the control means are disposed on an outer side of the photographic optical device 1.

The photographic optical device 1 is formed in a rectangular parallelepiped shape whose shape when viewed in a direction of an optical axis "L" of a photographic lens (optical axis direction) is formed in a substantially square shape. Four side faces of the photographic optical device 1 are substantially parallel to the right and left direction or the front and rear direction. As shown in FIGS. 1 and 2, the photographic optical device 1 includes a camera module 3 which is provided with a lens and an imaging element and is capable of being swung, a support body 4 which swingably supports the camera module 3, a swing drive mechanism 5 structured to swing the camera module 3 with respect to the support body 4 for correcting a shake such as a shake in hand, and a plate spring 6 as a spring member which connects the camera module 3 with the support body 4. Further, the photographic optical device 1 includes, as shown in FIG. 3, two reflection type optical sensors 7 (hereinafter, referred to as a "sensor 7") for detecting a relative position of the camera module 3 which is swung with respect to the support body 4.

In this embodiment, the upper and lower direction is substantially coincided with an optical axis direction of the camera module 3 when the camera module 3 is not swung and the position of the camera module 3 when the optical axis direction of the camera module 3 is coincided with the upper and lower direction is the home position of the camera module 3. Further, in this embodiment, an imaging element is attached to a lower end of the camera module 3 and an object to be photographed which is disposed on an upper side is photographed.

The camera module 3 is formed in a rectangular parallelepiped shape whose shape when viewed in the optical axis direction is a substantially square shape. Each of side faces in the front and rear direction and the right and left direction of the camera module 3 is fixed with a drive magnet 19 described below which structures the swing drive mechanism 5. Further, the camera module 3 includes a lens drive mechanism for driving a lens in an optical axis direction in addition to the lens and the imaging element. In other words, the photographic optical device 1 in this embodiment is also provided with an autofocus function. The lens drive mechanism is, for example, structured of a drive coil and a drive magnet. The lens drive mechanism may be structured of a piezo-electric element, a shape memory alloy or the like. Further, the camera module 3 may be provided with no lens drive mechanism. In other words, the photographic optical device 1 may be provided with no autofocus function.

The imaging element is mounted on a circuit board 9. The circuit board 9 is attached to a lower end side of the camera module 3. An "FPC" (flexible printed circuit board) 10 is connected with the circuit board 9 and the "FPC" 10 is extended on a lower end side of the photographic optical device 1 and is extended out from a side face of the photographic optical device 1. Further, an abutting plate 11 with which a spherical member 15 described below is abutted is fixed to an under face of the circuit board 9.

The support body 4 includes a case body 13 which structures four side faces in the front and rear direction and the right and left direction (outer peripheral face) of the photographic optical device 1, and a lower case body 14 which structures an under face side of the photographic optical device 1. The case body 13 is formed in a substantially rectangular tube shape and is disposed so as to surround the camera module 3 from an outer peripheral side. The lower case body 14 is formed in a substantially rectangular bottomed tube shape which is provided with a bottom part 14a and a tube part 14b.

The bottom part 14a of the lower case body 14 is disposed on a lower side. A center of the bottom part 14a is formed with a circular disposing hole 14c in which a lower end side of the spherical member 15 that is a supporting point for swinging of the camera module 3 is disposed. In this embodiment, a supporting point part 16 which is a swing center for the camera module 3 is structured of the spherical member 15 and the disposing hole 14c. The supporting point part 16 is disposed on a lower side with respect to the camera module 3 and an upper end of the spherical member 15 is abutted with an under face of the abutting plate 11.

The swing drive mechanism 5 includes four drive coils 18 and four drive magnets 19 which are respectively oppositely disposed to the four drive coils 18. The drive coil 18 is, for example, an air-core coil which is wound around in a substantially rectangular shape. Each of four drive coils 18 is fixed to each of four inner side faces which structure an inner peripheral face of the case body 13. The drive magnet 19 is, for example, formed in a substantially rectangular flat plate shape. Each of the four drive magnets 19 is fixed to each of side faces in the front and rear direction and the right and left direction of the camera module 3 so as to face the drive coil 18 in the front and rear direction or the right and left direction.

In this embodiment, a swing operation of the camera module 3 is performed in the right and left direction with the front and rear direction as an axial direction by the drive coils 18 and the drive magnets 19 facing each other in the right and left direction. Further, a swing operation of the camera module 3 in the front and rear direction is performed with the right and left direction as an axial direction by the drive coils 18 and the drive magnets 19 facing each other in the front and rear direction.

The plate spring 6 is provided with a movable side fixing part which is fixed to the camera module 3, a fixed side fixing part which is fixed to the support body 4, and a plurality of spring parts which connect the movable side fixing part with the fixed side fixing part. In this embodiment, the spring parts are resiliently bent with respect to the fixed side fixing part and thereby a swing operation of the camera module 3 is performed. Further, the plate spring 6 is fixed in a resiliently bent state so that an upper end of the spherical member 15 and the abutting plate 11 are surely abutted with each other and so that pressurization is occurred for surely abutting the lower end side of the spherical member 15 with the edge of the disposing hole 14c of the lower case body 14 (in other words, so that an urging force is occurred for urging the camera module 3 to a lower direction). Further, the plate spring 6 holds the camera module 3 so that the camera module 3 is disposed at the home position when an electric current is not supplied to the drive coil 18.

The sensor 7 is mounted on a circuit board 17 as shown in FIG. 3. The circuit board 17 on which one of two sensors 7 is mounted is fixed to one of the side faces in the front and rear direction of the support body 4, and the circuit board 17 on which the other of the two sensors 7 is mounted is fixed to one of the side faces in the right and left direction of the support body 4. In other words, the sensor 7 is fixed to the support body 4 through the circuit board 17. In this embodiment, a position in the front and rear direction of the camera module 3 is detected by the sensor 7 which is fixed to one of the side faces in the front and rear direction of the support body 4, and a position in the right and left direction of the camera module 3 is detected by the sensor 7 fixed to one of the side faces in the right and left direction of the support body 4. Next, the structure of the sensor 7 and the structure of the control circuit 20 for the sensor 7 will be described below.

(Structure of Reflection Type Optical Sensor and Control Circuit)

Figure 4:
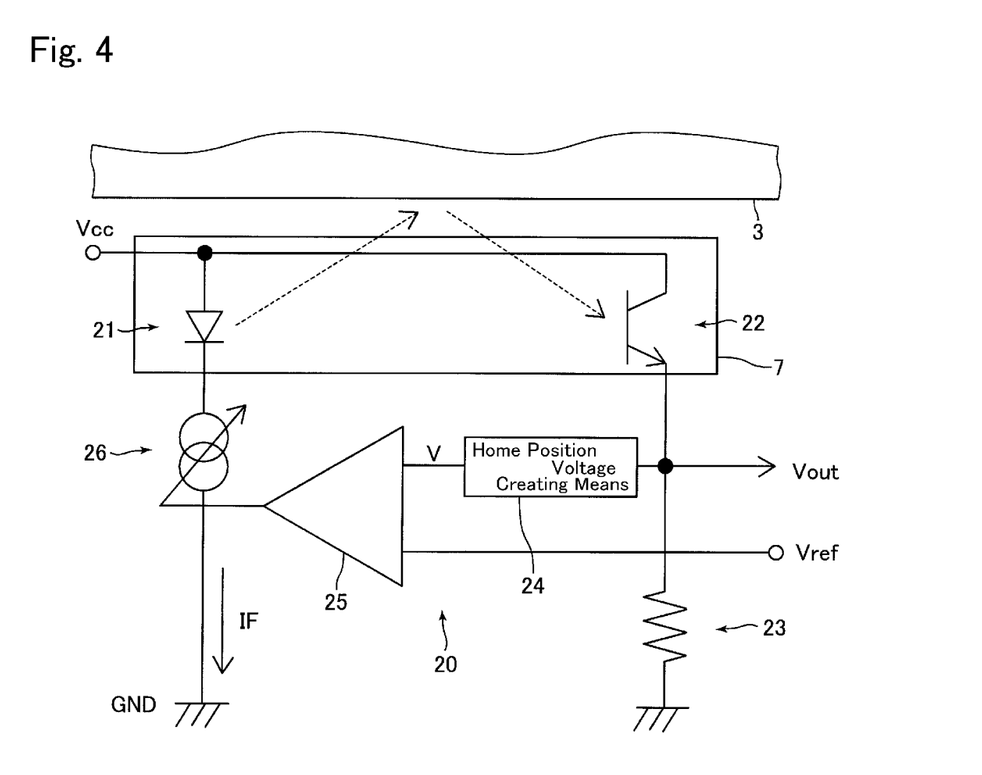
FIG. 4 is a schematic circuit diagram showing a reflection type optical sensor and a control circuit for the reflection type optical sensor shown in FIG. 3.
Figure 5:
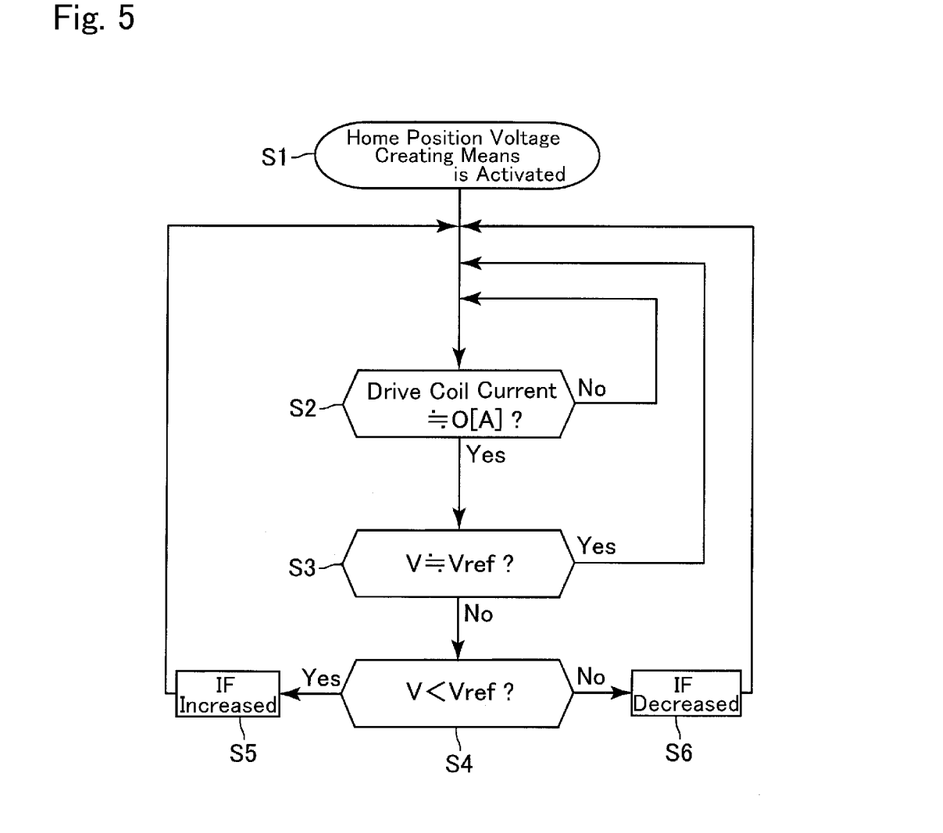
FIG. 5 is a flow chart showing a control flow of a light emitting amount of a light emitting element shown in FIG. 4.

FIG. 4 is a schematic circuit diagram showing the reflection type optical sensor 7 and the control circuit 20 for the reflection type optical sensor 7 shown in FIG. 3. FIG. 5 is a flow chart showing a control flow of a light emitting amount of a light emitting element 21 shown in FIG. 4.

The sensor 7 is a photo reflector which includes a light emitting element 21 and a light receiving element 22. The light emitting element 21 is, for example, a light emitting diode and the light receiving element 22 is, for example, a photo-transistor. The sensor 7 is oppositely disposed to a side face of the camera module 3 so that light emitted from the light emitting element 21 is reflected by the side face of the camera module 3 to be incident on the light receiving element 22. When the reflected light is incident on the light receiving element 22, an emitter current flows as an output current of the light receiving element 22.

A light emitting amount of the light emitting element 21 varies depending on an electric current "IF" which is supplied to the light emitting element 21. Specifically, when an electric current "IF" is increased, the light emitting amount of the light emitting element 21 is increased and, when the electric current "IF" is decreased, the light emitting amount of the light emitting element 21 is decreased.

An output current of the light receiving element 22 varies depending on an amount of a received light of the light receiving element 22. In other words, when a distance between the camera module 3 which reflects the light from the light emitting element 21 and the sensor 7 is varied and thereby an amount of the received light of the light receiving element 22 is varied, an output current of the light receiving element 22 is varied. Specifically, when an amount of the received light of the light receiving element 22 is increased, an output current of the light receiving element 22 becomes larger and, when an amount of the received light of the light receiving element 22 is decreased, an output current of the light receiving element 22 becomes smaller. In this embodiment, a variation of a relative distance between the camera module 3 and the sensor 7 is detected by utilizing a variation of an output current of the light receiving element 22.

The control circuit 20 is mounted on the circuit board 17 and includes a resistor 23, a home position voltage creating means 24, a comparator 25 and a variable current source 26. Further, the control circuit 20 includes a power supply (not shown) which is connected with an anode of the light emitting element 21 and a collector of the light receiving element 22, and a power source voltage "Vcc" is applied to the light emitting element 21 and the light receiving element 22.

The resistor 23 is connected with an emitter of the light receiving element 22 to convert an output current of the light receiving element 22 into an output voltage "Vout". In this embodiment, a relative position of the camera module 3 to the support body 4 is detected on the basis of a magnitude of the output voltage "Vout" (magnitude of an output of the sensor 7).

An input side of the home position voltage creating means 24 is connected with a point between the emitter of the light receiving element 22 and the resistor 23 and an output side of the home position voltage creating means 24 is connected with one of two input parts of the comparator 25. Further, a current control circuit (not shown) for controlling an electric current supplied to the drive coil 18 is connected with the home position voltage creating means 24. The home position voltage creating means 24 creates the home position voltage "V" which is the output voltage "Vout" when the camera module 3 is located at the home position or in the vicinity of the home position. In this embodiment, the home position voltage creating means 24 creates a home position voltage "V" by judging whether the camera module 3 is located at the home position or in the vicinity of the home position or not based on an electric current supplied to the drive coil 18.

Specifically, the home position voltage creating means 24 judges that the camera module 3 is located at the home position or in the vicinity of the home position when an electric current supplied to the drive coil 18 is within a predetermined reference range (more specifically, when an electric current supplied to the drive coil 18 is "0" or close to "0"), and the home position voltage creating means 24 creates a home position voltage "V" by utilizing the output voltage "Vout" at that time. More specifically, in this embodiment, the home position voltage creating means 24 calculates an average value of a plurality of output voltages "Vout", in other words, a plurality of output voltages "Vout" which are sampled within a predetermined time period, when an electric current supplied to the drive coil 18 is within a predetermined reference range (when an electric current supplied to the drive coil 18 is "0" or close to "0"). The average value is determined as the home position voltage "V".

For example, in this embodiment, the home position voltage creating means 24 calculates an average value of a plurality of output voltages "Vout" which are sampled within a predetermined time period when an electric current supplied to the drive coil 18 is within a range of ±1 mA and the calculated average value is determined as the home position voltage "V". In this case, for example, the home position voltage creating means 24 calculates the average value by moving averages. Therefore, whenever an electric current supplied to the drive coil 18 falls within a predetermined reference range, the home position voltage "V" is updated. In other words, whenever the camera module 3 is located at the home position or in the vicinity of the home position, the home position voltage "V" is updated. In this embodiment, for example, inclination of the optical axis "L" with respect to the upper and lower direction when an electric current supplied to the drive coil 18 is within a range of ±1 mA is about 0.01° and thus, in a case that an electric current supplied to the drive coil 18 is within the range of ±1 mA, the camera module 3 is estimated to be located at the home position or in the vicinity of the home position.

Further, the home position voltage creating means 24 connected with the light receiving element 22 of the sensor 7 which is fixed to one of the side faces in the front and rear direction of the support body 4 judges whether the camera module 3 is located at the home position or in the vicinity of the home position or not based on an electric current supplied to the drive coil 18 which is fixed to the side faces in the front and rear direction of the case body 13 and the home position voltage "V" is created. Further, the home position voltage creating means 24 connected with the light receiving element 22 of the sensor 7 which is fixed to one of the side faces in the right and left direction of the support body 4 judges whether the camera module 3 is located at the home position or in the vicinity of the home position or not based on an electric current supplied to the drive coil 18 which is fixed to the side faces in the right and left direction of the case body 13 and the home position voltage "V" is created.

The comparator 25 compares the home position voltage "V" created by the home position voltage creating means 24 and a predetermined reference voltage "Vref" and, when there is a difference between the home position voltage "V" and the reference voltage "Vref", an output signal corresponding to the difference is outputted.

The variable current source 26 controls an electric current which is supplied to the light emitting element 21 based on an output signal from the comparator 25. Specifically, the variable current source 26 decreases an electric current "IF" supplied to the light emitting element 21 based on an output signal from the comparator 25 which is outputted when the home position voltage "V" is larger than the reference voltage "Vref" and increases an electric current "IF" supplied to the light emitting element 21 based on an output signal from the comparator 25 which is outputted when the home position voltage "V" is smaller than the reference voltage "Vref". Further, when the home position voltage "V" is substantially equal to the reference voltage "Vref" and an output signal is not outputted from the comparator 25, the variable current source 26 maintains the electric current "IF" supplied to the light emitting element 21 without changing the electric current "IF".

In this embodiment, in order to restrain influence on the output voltage "Vout" of individual differences of the light emitting element 21 and the light receiving element 22 and an environmental variation such as a temperature change, a light emitting amount of the light emitting element 21 is controlled as described below. In other words, as shown by the flow in FIG. 5, when the home position voltage creating means 24 is activated (step S1), the home position voltage creating means 24 judges whether an electric current supplied to the drive coil 18 is within a predetermined reference range or not (step S2). For example, the home position voltage creating means 24 judges whether an electric current supplied to the drive coil 18 is within a range of ±1 mA or not.

In the step "S2", in a case that an electric current supplied to the drive coil 18 is within a predetermined reference range (in other words, in a case that an electric current supplied to the drive coil 18 is "0" or close to "0"), the home position voltage creating means 24 creates a home position voltage "V" and the comparator 25 compares the home position voltage "V" with the reference voltage "Vref" (step S3).

In the step "S3", in a case that the home position voltage "V" and the reference voltage "Vref" are substantially equal to each other, the flow is returned to the step "S2". On the other hand, in the step "S3", when there is a difference between the home position voltage "V" and the reference voltage "Vref", the comparator 25 outputs an output signal corresponding to the difference to the variable current source 26 and, when the home position voltage "V" is smaller than the reference voltage "Vref" ("Yes" in step S4), the variable current source 26 increases an electric current "IF" supplied to the light emitting element 21 (step S5) and then the flow is returned to the step "S2". Further, when the home position voltage "V" is larger than the reference voltage "Vref" ("No" in step S4), the variable current source 26 decreases an electric current "IF" supplied to the light emitting element 21 (step S6) and then the flow is returned to the step "S2".

In a cellular phone or the like on which the photographic optical device 1 is mounted, when a photographic optical system structuring a part of the cellular phone or the like is set in an ON state, the home position voltage creating means 24 is activated (the above-mentioned Step 1). In other words, in the cellular phone or the like on which the photographic optical device 1 is mounted, when a photographing mode is set, the home position voltage creating means 24 is activated. Further, in this embodiment, as described above, the photographic optical system includes a control means which controls on/off of a shake correcting function of the photographic optical device 1. However, when the photographic optical system is set in an ON state, the home position voltage creating means 24 is activated regardless of whether the shake correcting function of the photographic optical device 1 is in an ON state or not and the control flow shown in FIG. 5 is executed. In other words, when the photographic optical system is set in an ON state, the light emitting amount of the light emitting element 21 is controlled regardless of the shake correcting function of the photographic optical device 1 is in an ON state or not.

(Schematic Operation of Photographic Optical Device)

In the photographic optical device 1 structured as described above, when the shake correcting function is set in an ON state and a variation of inclination of the support body 4 is detected by the angular velocity sensor which is disposed on an outer side of the photographic optical device 1, an electric current is supplied to the drive coil 18 on the basis of a detection result by the angular velocity sensor. When an electric current is supplied to the drive coil 18, the camera module 3 is swung so that the optical axis "L" is inclined with the supporting point part 16 as a swing center and the right and left direction and/or the front and rear direction as an axial direction and thereby the shake is corrected. At the time of correcting the shake, a swing amount of the camera module 3 (in other words, an electric current supplied to the drive coil 18) is controlled on the basis of a detection result by the sensor 7. In the photographic optical device 1 in this embodiment, even when the shake correcting function is in an off state, as described above, the home position voltage creating means 24 is activated and a light emitting amount of the light emitting element 21 is controlled.

In this embodiment, a shake correction mechanism which swings the camera module 3 so that the optical axis "L" is inclined with respect to the support body 4 for correcting a shake is structured of the plate spring 6, the swing drive mechanism 5, the supporting point part 16 and the like.

(Principal Effects in this Embodiment)

As described above, in the photographic optical device 1 in this embodiment, the home position voltage creating means 24 creates the home position voltage "V" which is an output voltage of the light receiving element 22 when the camera module 3 is located at the home position or in the vicinity of home position and the comparator 25 compares the home position voltage "V" generated by the home position voltage creating means 24 with the reference voltage "Vref". Further, the variable current source 26 decreases an electric current "IF" supplied to the light emitting element 21 when the home position voltage "V" is larger than the reference voltage "Vref" and increases an electric current "IF" supplied to the light emitting element 21 when the home position voltage "V" is smaller than the reference voltage "Vref" and, in addition, when the home position voltage "V" is substantially equal to the reference voltage "Vref", the electric current "IF" supplied to the light emitting element 21 is maintained without being changed.

Therefore, even when a distance between the camera module 3 and the sensor 7 is varied with swinging of the camera module 3 and, as a result, the output voltage "Vout" is varied, in a case that the camera module 3 is located at the home position or in the vicinity of the home position, the output voltage "Vout" of the light receiving element 22 is maintained to be substantially constant. Accordingly, in this embodiment, even when a distance between the camera module 3 and the sensor 7 is varied with swinging of the camera module 3, an output of the sensor 7 is obtained in which influence of individual differences of the light emitting element 21 and the light receiving element 22 and an environmental variation is restrained. As a result, in this embodiment, even when there are individual differences of the light emitting element 21 and the light receiving element 22 and an environmental variation, the position of the camera module 3 is appropriately detected by the sensor 7 and a shake correction is appropriately performed. Especially in this embodiment, even when the shake correcting function of the photographic optical device 1 is set in an OFF state, a light emitting amount of the light emitting element 21 is controlled. Therefore, even in a case that there are individual differences of the light emitting element 21 and the light receiving element 22 and an environmental variation, when the shake correcting function is set in an ON state, the position of the camera module 3 is immediately and appropriately detected by the sensor 7 and thereby an appropriate shake correction is performed.

In this embodiment, the plate spring 6 holds the camera module 3 so that the camera module 3 is disposed at the home position when an electric current is not supplied to the drive coil 18. Therefore, when an electric current which is supplied to the drive coil 18 is "0" or close to "0", the camera module 3 is located at the home position or in the vicinity of the home position. Further, in this embodiment, the home position voltage creating means 24 creates the home position voltage "V" by utilizing the output voltage "Vout" when an electric current supplied to the drive coil 18 is "0" or close to "0". Therefore, in this embodiment, the home position voltage creating means 24 creates the home position voltage "V" with a high degree of accuracy based on an electric current supplied to the drive coil 18.

Further, in this embodiment, the home position voltage creating means 24 creates the home position voltage "V" when an electric current supplied to the drive coil 18 is "0" and, in addition, close to "0". Therefore, in comparison with a case that the home position voltage creating means 24 creates the home position voltage "V" only when the electric current supplied to the drive coil 18 is "0", an updating frequency of the home position voltage "V" is increased. Accordingly, the output of the sensor 7 in which influence of an environmental variation such as a temperature variation is appropriately restrained is obtained.

In this embodiment, the home position voltage creating means 24 calculates an average value of a plurality of the output voltages "Vout" which are sampled within a predetermined time period when the electric current supplied to the drive coil 18 is "0" or close to "0" and the average value is used as the home position voltage "V". Therefore, in comparison with a case that the output voltage "Vout" when the electric current supplied to the drive coil 18 is "0" or close to "0" is set to be a home position voltage "V" as it is, the variation of the home position voltage "V" is restrained and accuracy of the generated home position voltage "V" is enhanced.

(First Modified Example of Home Position Voltage Creating Means)

In the embodiment described above, the home position voltage creating means 24 calculates an average value of a plurality of output voltages "Vout" which are sampled within a predetermined time period when an electric current supplied to the drive coil 18 is "0" or close to "0", and the average value is set to be the home position voltage "V". However, the present invention is not limited to this embodiment. For example, the home position voltage creating means 24 may set the output voltage "Vout" when an electric current supplied to the drive coil 18 is "0" or close to "0" as the home position voltage "V" as it is.

In the embodiment described above, the home position voltage creating means 24 creates the home position voltage "V" by utilizing the output voltage "Vout" when an electric current supplied to the drive coil 18 is "0" or close to "0". However, the present invention is not limited to this embodiment. For example, the home position voltage creating means 24 may create the home position voltage "V" only when an electric current supplied to the drive coil 18 is "0". In this case, the home position voltage "V" is created by utilizing the output voltage "Vout" when the camera module 3 is located at the home position and thus accuracy of the generated home position voltage "V" is further enhanced. In this case, the output voltage "Vout" when an electric current supplied to the drive coil 18 is "0" may be set in the home position voltage "V" as it is without calculating an average value of a plurality of the output voltages "Vout" when an electric current supplied to the drive coil 18 is "0".

(Second Modified Example of Home Position Voltage Creating Means)

In the embodiment described above, when the photographic optical system is set in an ON state, the home position voltage creating means 24 is activated and the control flow shown in FIG. 5 is executed regardless of whether the shake correcting function of the photographic optical device 1 is in an ON state or not. However, the present invention is not limited to this embodiment. For example, it may be structured that, when the shake correcting function of the photographic optical device 1 is set in an ON state, the home position voltage creating means 24 is activated and the control flow shown in FIG. 5 is executed.

Further, the control flow shown in FIG. 5 may be executed only when the shake correcting function of the photographic optical device 1 is in an OFF state. In this case, the home position voltage creating means 24 creates and stores the home position voltage "V" when the shake correcting function is in an OFF state and, when the shake correcting function is in an ON state, the comparator 25 compares the reference voltage "Vref" with the home position voltage "V" stored in the home position voltage creating means 24 in the OFF state. When the shake correcting function is in an OFF state, an electric current is not supplied to the drive coil 18 and the camera module 3 is located at the home position. Therefore, in this case, the home position voltage creating means 24 creates the home position voltage "V" with a further higher degree of accuracy. It takes a considerably long time to occur an environmental variation such as a temperature variation and thus, even when the control flow shown in FIG. 5 is executed only at the time when the shake correcting function of the photographic optical device 1 is in an OFF state, the output of the sensor 7 is obtained in which influence of individual differences of the light emitting element 21 and the light receiving element 22 and an environmental variation is restrained.

(Third Modified Example of Home Position Voltage Creating Means)

In the embodiment described above, the home position voltage creating means 24 creates the home position voltage "V" by judging whether the camera module 3 is located at the home position or in the vicinity of the home position or not based on an electric current supplied to the drive coil 18. However, the present invention is not limited to this embodiment. For example, the home position voltage creating means 24 may create the home position voltage "V" by judging whether the camera module 3 is located at the home position or in the vicinity of the home position or not based on an output signal from the angular velocity sensor or an integral value of an output signal from the angular velocity sensor which is disposed on an outer side of the photographic optical device 1. Specifically, the home position voltage creating means 24 judges that the camera module 3 is located at the home position or in the vicinity of the home position when an output signal from the angular velocity sensor or an integral value of an output signal from the angular velocity sensor is within a predetermined reference range (more specifically, when an output signal from the angular velocity sensor or an integral value of an output signal from the angular velocity sensor is "0" or close to "0"), and the home position voltage creating means 24 creates the home position voltage "V" by utilizing an output voltage "Vout" at that time. More specifically, for example, the home position voltage creating means 24 may calculate an average value of a plurality of output voltages "Vout" which are sampled in a predetermined time period when an output signal from the angular velocity sensor or an integral value of an output signal from the angular velocity sensor is within a predetermined reference range (when an output signal from the angular velocity sensor or an integral value of an output signal from the angular velocity sensor is "0" or close to "0"), and the average value is set as the home position voltage "V".

When there is no output signal from the angular velocity sensor or, when an output signal from the angular velocity sensor is small, the photographic optical device 1 is not inclined or its inclination is a very little and thus a shake correcting operation is not performed and the camera module 3 is located at the home position or in the vicinity of home position. Therefore, also in this case, the home position voltage creating means 24 is capable of creating the home position voltage "V" with a higher degree of accuracy based on an output signal from the angular velocity sensor or an integral value of an output signal from the angular velocity sensor.

In the embodiment described above, the angular velocity sensor is disposed on an outer side of the photographic optical device 1 but the angular velocity sensor may be disposed on an inner side of the photographic optical device 1. In other words, the photographic optical device 1 may include an angular velocity sensor for detecting a variation of inclination of the photographic optical device 1. Further, in the embodiment described above, two angular velocity sensors, i.e., an angular velocity sensor for detecting a variation of the inclination of the photographic optical device 1 in the front and rear direction, and an angular velocity sensor for detecting a variation of the inclination of the photographic optical device 1 in the right and left direction, are disposed on the outer side of the photographic optical device 1. However, one angular velocity sensor may be disposed on an outer side of the photographic optical device 1 for detecting a variation of inclination of the photographic optical device 1 in the front and rear direction and the right and left direction. In other words, two angular velocity sensors which respectively detect a variation of inclination of one-axis direction may be used or one angular velocity sensor which detects a variation of inclination of two-axes direction may be used.

(Fourth Modified Example of Home Position Voltage Creating Means)

In the embodiment described above, the home position voltage creating means 24 judges whether the camera module 3 is located at the home position or in the vicinity of the home position or not based on an electric current supplied to the drive coil 18 and creates the home position voltage "V". However, the present invention is not limited to this embodiment. For example, the home position voltage creating means 24 is a low pass filter which eliminates a high-frequency component of the output voltage "Vout" of the light receiving element 22 and the output voltage "Vout" of the light receiving element 22 after the high-frequency component is eliminated may be used as the home position voltage "V". Further, the home position voltage creating means 24 may be an average value calculator which calculates an average value of a plurality of output voltages "Vout" of the light receiving element 22 which are sampled within a predetermined time period, and the average value of a plurality of the output voltages "Vout" of the light receiving element 22 which is calculated by the average value calculator may be set as the home position voltage "V". In these cases, the home position voltage creating means 24 is not required to judge an electric current supplied to the drive coil 18 and thus the structure of the home position voltage creating means 24 is relatively simplified. Further, also in these cases, influence of a variation of the output voltage "Vout" due to swinging of the camera module 3 is restrained and thus the home position voltage creating means 24 is capable of creating the home position voltage "V" with a higher degree of accuracy. In a case that the home position voltage creating means 24 is an average value calculator, for example, the average value is calculated by moving averages.

(Other Embodiments)

Although the present invention has been shown and described with reference to a specific embodiment, various changes and modifications will be apparent to those skilled in the art from the teachings herein.

In the embodiment described above, at least an embodiment of the present invention is applied to the photographic optical device 1 including the camera module 3 as an example. However, the sensor 7 and the control circuit 20 may be applied to a device other than the photographic optical device 1. For example, the sensor 7 and the control circuit 20 may be applied to a distance variation amount detecting device which detects a variation of a relative distance between a movable object to be detected which reflects light from the light emitting element 21 toward the light receiving element 22 and the sensor 7.

Also in the distance variation amount detecting device, the home position voltage "V" which is an output voltage "Vout" of the light receiving element 22 is created by the home position voltage creating means 24 when an object to be detected is located at the home position or in the vicinity of the home position, the home position voltage "V" created by the home position voltage creating means 24 and the reference voltage "Vref" are compared with each other by the comparator 25, and an electric current "IF" supplied to the light emitting element 21 is controlled by the variable current source 26 based on an output signal from the comparator 25. Therefore, even when the output of the sensor 7 is varied due to a variation of the distance between an object to be detected and the sensor 7 with movement of the object, the output of the sensor 7 when the object is located at the home position or in the vicinity of the home position is capable of being kept substantially constant. Accordingly, in the distance variation amount detecting device, even when a distance between an object to be detected which reflects light from the light emitting element 21 and the sensor 7 is varied with movement of the object, the output of the sensor 7 is obtained in which influence of individual differences of the light emitting element 21 and the light receiving element 22 and an environmental variation is restrained. As a result, in the distance variation amount detecting device, even when there are individual differences of the light emitting element 21 and the light receiving element 22 and an environmental variation, a variation of a relative distance between an object to be detected and the sensor 7 is appropriately detected by the sensor 7.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A photographic optical device comprising:
   a reflection type optical sensor which comprises a light emitting element whose light emitting amount is varied depending on a supplied electric current and a light receiving element whose output current is varied depending on an amount of received light;
   a support body to which the reflection type optical sensor is fixed;
   a camera module which comprises a lens and an imaging element and is supported by the support body so as to be capable of being swung, and the camera module reflecting light from the light emitting element toward the light receiving element;
   a shake correction mechanism structured to swing the camera module so as to incline an optical axis of the lens with respect to the support body to correct a shake;
   a resistor configured to convert an output current of the light receiving element to an output voltage;
   a home position voltage creating means configured to create a home position voltage that is an output voltage of the light receiving element when the camera module is located at a predetermined home position or in the vicinity of the home position;
   a comparator configured to compare the home position voltage created by the home position voltage creating means with a predetermined reference voltage; and
   a variable current source configured to control an electric current supplied to the light emitting element based on an output signal from the comparator;
   wherein a relative position of the camera module with respect to the support body is detected by the reflection type optical sensor.

2. The photographic optical device according to claim 1, wherein
   the variable current source is configured to decrease an electric current supplied to the light emitting element based on an output signal from the comparator which is outputted when the home position voltage is larger than the reference voltage,
   the variable current source is configured to increase an electric current supplied to the light emitting element based on an output signal from the comparator which is outputted when the home position voltage is smaller than the reference voltage, and
   the variable current source is configured to maintain an electric current supplied to the light emitting element when the home position voltage is substantially equal to the reference voltage and an output signal is not outputted from the comparator.

3. The photographic optical device according to claim 1, wherein
   the shake correction mechanism comprises:
      a drive coil structured to swing the camera module; and
      a spring member which connects the support body with the camera module and holds the camera module at the home position when an electric current is not supplied to the drive coil; and
   the home position voltage creating means is configured to judge whether the camera module is located at the home position or in the vicinity of the home position or not based on an electric current supplied to the drive coil and the home position voltage creating means creates the home position voltage.

4. The photographic optical device according to claim 3, wherein the home position voltage creating means is configured to judge that the camera module is located at the home position or in the vicinity of the home position when an electric current supplied to the drive coil is within a predetermined reference range to create the home position voltage.

5. The photographic optical device according to claim 4, wherein the home position voltage creating means is configured to create an average value of a plurality of output voltages of the light receiving element which are sampled within a predetermined time period when the electric current supplied to the drive coil is within the predetermined reference range as the home position voltage.

6. The photographic optical device according to claim 1, wherein
the home position voltage creating means is a low pass filter which eliminates a high-frequency component of an output voltage of the light receiving element, and
the output voltage of the light receiving element after the high-frequency component is eliminated is the home position voltage.

7. The photographic optical device according to claim 1, wherein
the home position voltage creating means is an average value calculator which calculates an average value of a plurality of output voltages of the light receiving element that are sampled within a predetermined time period, and
the average value of a plurality of output voltages of the light receiving element which is calculated by the average value calculator is the home position voltage.

8. The photographic optical device according to claim 1, further comprising an angular velocity sensor structured to detect a variation of inclination of the camera module;
wherein the shake correction mechanism comprises:
a drive coil structured to swing the camera module; and
a spring member which connects the support body with the camera module and holds the camera module at the home position when an electric current is not supplied to the drive coil;
wherein when a variation of inclination of the camera module is detected by the angular velocity sensor in an "ON" state of a shake correcting function in the shake correction mechanism, the inclination of the camera module is corrected by supplying an electric current to the drive coil based on a detection result by the angular velocity sensor, and
wherein when the camera module is detected to be located at the home position or in the vicinity of the home position, the home position voltage creating means is configured to create the home position voltage.

9. The photographic optical device according to claim 8, wherein the home position voltage creating means is configured to judge whether the camera module is located at the home position or in the vicinity of the home position or not based on an electric current supplied to the drive coil and the home position voltage creating means creates the home position voltage.

10. The photographic optical device according to claim 9, wherein the home position voltage creating means is configured to create an average value of a plurality of output voltages of the light receiving element which are sampled within a predetermined time period when the electric current supplied to the drive coil is within a predetermined reference range as the home position voltage.

11. The photographic optical device according to claim 8, wherein the home position voltage creating means is configured to judge whether the camera module is located at the home position or in the vicinity of the home position or not based on an output signal from the angular velocity sensor or an integral value of an output signal from the angular velocity sensor to create the home position voltage.

12. A photographic optical system comprising:
a photographic optical device comprising:
a reflection type optical sensor which comprises a light emitting element whose light emitting amount is varied depending on a supplied electric current and a light receiving element whose output current is varied depending on an amount of received light;
a support body to which the reflection type optical sensor is fixed;
a camera module which comprises a lens and an imaging element and is supported by the support body so as to be capable of being swung, and the camera module reflecting light from the light emitting element toward the light receiving element;
a shake correction mechanism structured to swing the camera module so as to incline an optical axis of the lens with respect to the support body to correct a shake;
a resistor configured to convert an output current of the light receiving element to an output voltage;
a home position voltage creating means configured to create a home position voltage that is an output voltage of the light receiving element when the camera module is located at a predetermined home position or in the vicinity of the home position;
a comparator configured to compare the home position voltage created by the home position voltage creating means with a predetermined reference voltage; and
a variable current source configured to control an electric current supplied to the light emitting element based on an output signal from the comparator;
wherein a relative position of the camera module with respect to the support body is detected by the reflection type optical sensor; and
an angular velocity sensor structured to detect a variation of inclination of the support body;
wherein the home position voltage creating means is configured to judge whether the camera module is located at the home position or in the vicinity of the home position or not based on an output signal from the angular velocity sensor or an integral value of an output signal from the angular velocity sensor to create the home position voltage.

13. A photographic optical system comprising:
a photographic optical device comprising:
a reflection type optical sensor which comprises a light emitting element whose light emitting amount is varied depending on a supplied electric current and a light receiving element whose output current is varied depending on an amount of received light;
a support body to which the reflection type optical sensor is fixed;
a camera module which comprises a lens and an imaging element and is supported by the support body so as to be capable of being swung, and the camera module reflecting light from the light emitting element toward the light receiving element;
a shake correction mechanism structured to swing the camera module so as to incline an optical axis of the lens with respect to the support body to correct a shake;
a resistor which configured to convert an output current of the light receiving element to an output voltage;
a home position voltage creating means configured to create a home position voltage that is an output voltage of the light receiving element when the camera module is located at a predetermined home position or in the vicinity of the home position;

a comparator configured to compare the home position voltage created by the home position voltage creating means with a predetermined reference voltage; and a variable current source configured to control an electric current supplied to the light emitting element based on an output signal from the comparator;

wherein a relative position of the camera module with respect to the support body is detected by the reflection type optical sensor;

wherein the shake correction mechanism comprises:
   a drive coil structured to swing the camera module; and
   a spring member which connects the support body with the camera module and holds the camera module at the home position when an electric current is not supplied to the drive coil; and wherein the home position voltage creating means is configured to judge whether the camera module is located at the home position or in the vicinity of the home position or not based on an electric current supplied to the drive coil and the home position voltage creating means is configured to create the home position voltage; and a control means configured to control "ON" and "OFF" of a shake correcting function of the photographic optical device;

wherein the home position voltage creating means is configured to create and store the home position voltage when the shake correcting function is in an "OFF" state; and wherein when the shake correcting function is in an "ON" state, the comparator is configured to compare the home position voltage stored in the home position voltage creating means when the shake correcting function is in the "OFF" state with the reference voltage.

14. The photographic optical system according to claim 13, wherein the home position voltage creating means is configured to judge that the camera module is located at the home position or in the vicinity of the home position when an electric current supplied to the drive coil is within a predetermined reference range to create the home position voltage.

15. The photographic optical system according to claim 14, wherein the home position voltage creating means is configured to create an average value of a plurality of output voltages of the light receiving element which are sampled within a predetermined time period when the electric current supplied to the drive coil is within the predetermined reference range as the home position voltage.

16. A distance variation amount detecting device having a reflection type optical sensor which is provided with a light emitting element whose light emitting amount is varied depending on a supplied electric current and a light receiving element whose output current is varied depending on an amount of received light, and the distance variation amount detecting device detecting a variation of a relative distance between a movable object to be detected which reflects light from the light emitting element toward the light receiving element and the reflection type optical sensor, the distance variation amount detecting device comprising:

a resistor configured to convert an output current of the light receiving element to an output voltage;

a home position voltage creating means configured to create a home position voltage that is an output voltage of the light receiving element when the movable object is located at a predetermined home position or in the vicinity of the home position;

a comparator configured to compare the home position voltage created by the home position voltage creating means with a predetermined reference voltage; and a variable current source configured to control an electric current supplied to the light emitting element based on an output signal from the comparator.

* * * * *